(12) United States Patent
Vandewinckel et al.

(10) Patent No.: US 9,901,848 B2
(45) Date of Patent: Feb. 27, 2018

(54) FLUID STABILIZER DISC

(71) Applicant: XEROX CORPORATION, Norwalk, CT (US)

(72) Inventors: Judith M. Vandewinckel, Livonia, NY (US); Monica B. Skerker, Pittsford, NY (US); Kevin F. Marcell, Webster, NY (US); Michael L. Mehan, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 579 days.

(21) Appl. No.: 14/515,025

(22) Filed: Oct. 15, 2014

(65) Prior Publication Data

US 2016/0107102 A1 Apr. 21, 2016

(51) Int. Cl.
*B01D 19/00* (2006.01)
*B01D 19/02* (2006.01)

(52) U.S. Cl.
CPC .................................. *B01D 19/02* (2013.01)

(58) Field of Classification Search
CPC ..... B01D 19/00; B01D 19/02–19/0495; B67B 1/00–2201/12; B65D 88/34–88/50
USPC ................ 137/255–267, 343–382.5; 95/242; 96/176
See application file for complete search history.

(56) References Cited

U.S. PATENT DOCUMENTS

| 1,449,114 | A | | 3/1923 | Hayduck | |
|---|---|---|---|---|---|
| 4,166,801 | A | | 9/1979 | Shimomoto | |
| 5,397,072 | A | * | 3/1995 | Schoeppel | G11B 15/26 242/342 |
| 5,948,262 | A | * | 9/1999 | Todd | B01J 2/006 210/150 |
| 8,029,208 | B1 | * | 10/2011 | Lee | E04H 4/08 405/63 |
| 8,758,492 | B2 | | 6/2014 | Buttiker et al. | |
| 2010/0326342 | A1 | * | 12/2010 | Alirol | B63B 3/06 114/267 |

* cited by examiner

*Primary Examiner* — T. Bennett McKenzie
(74) *Attorney, Agent, or Firm* — MH2 Technology Law Group LLP

(57) ABSTRACT

A stabilizer disc for a liquid that reduces or prevents the formation of a foam on an upper surface of the liquid. The stabilizer disc has a width and a height, wherein the width is greater than the height. The stabilizer disc further has a surface roughness within a disclosed range of surface roughness (i.e., surface finish) values. Further, a plurality of stabilizer discs may be used to cover a disclosed percentage of a surface area of the fluid. A method for reducing the formation of a foam on the liquid within a container during transport and/or storage is also described.

7 Claims, 4 Drawing Sheets

FLUID STABILIZER DISC

TECHNICAL FIELD

The present teachings relate to the field of fluid transportation and storage and, more particularly, to chemical and/or physical stabilization of a fluid during transport and/or storage.

BACKGROUND

Liquid chemicals and other fluids are commonly transported between two points, for example from a chemical supplier to a product manufacturer, between manufacturing facilities, etc., using vehicles such as trucks, railcars, or aircraft. Agitation of a fluid such as an aqueous fluid during transport from movement of a vehicle or shipping container is difficult to prevent and can lead to mixing of the fluid with air. Mixing can also occur during storage of the chemical by vibrations transferred to the storage container and liquid from, for example, nearby equipment. Even if mixing with air does not result in a chemical reaction between the fluid and the air to which the fluid is exposed, physical separation of components within a fluid mixture or destabilization of fluid components and creation of byproducts can occur as a result of the agitation of the fluid.

A technique to reduce or eliminate adverse effects resulting from movement of a fluid during transport would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment of the present teachings, a stabilizer for use within a liquid includes a stabilizer disc, where the stabilizer disc includes a width and a height, wherein the width is greater than the height, and a surface roughness, wherein an average roughness centerline "$R_a$" of the surface roughness is from 0.76 µm to 1.1 µm and the at least one disc is configured to float on a surface of the liquid to reduce form formation within the liquid.

Another embodiment of the present teachings includes a liquid and a stabilizer within the liquid, wherein the stabilizer includes at least one stabilizer disc. The at least one stabilizer disc includes a width and a height, wherein the width is greater than the height, a surface roughness, wherein an average roughness centerline "$R_a$" of the surface roughness is from 0.76 µm to 1.1 µm, and a density, wherein the density is less than a density of the liquid.

In another embodiment, a method for reducing the formation of a foam on a liquid within a container during transport and/or storage can include placing at least one stabilizer disc into the liquid within the container, wherein the at least one stabilizer disc includes a width and a height, wherein the width is greater than the height, a surface roughness, wherein an average roughness centerline "$R_a$" of the surface roughness is from 0.76 µm to 1.1 µm, a density that is less than a density of the liquid such that the stabilizer disc floats on an upper surface of the liquid during the transport and/or storage.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
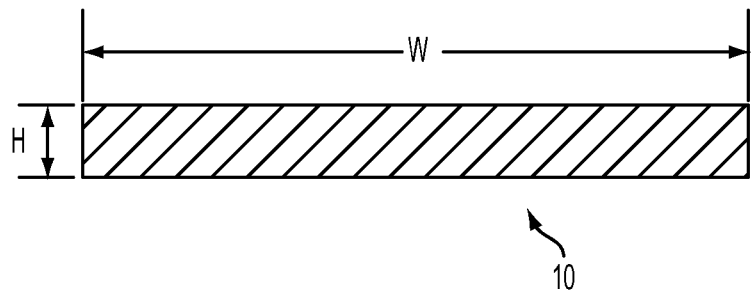
FIG. 1 is a cross section.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

Transportation of fluids between two locations and/or storage of a fluid at a single location can result in physical or chemical changes to the fluid during transport and/or storage. For example, foam can form on the surface of a fluid during transportation of the fluid. Without being bound by theory, the foam may result from demulsification of the fluid during transport of the fluid within a shipping or storage container such as a tanker, a tote, or other vessel. The demulsification may occur from ingestion of air by the fluid, low amplitude vibration or other vibration of the fluid, and/or vibration of the container that is transmitted to the fluid during transport of the fluid, and/or agitation of the fluid during pumping of the fluid into a container. Foam is known to form on many different liquids during agitation and storage, for example liquid chemicals and other fluids used in manufacturing, liquids used in the pharmaceutical industry, in food production, in chemical supply, as well as others.

Regardless of the causes, the foam may float to the surface of the fluid during transportation or storage. Additionally, the foam may form during pumping of the liquid from a storage container into another receptacle. In the case of an aqueous liquid that includes a wax and a surfactant, the foam that results from vibration or agitation of the liquid during transport and/or storage can be a waxy substance that may include submicron de-emulsified particles that do not redisperse into the fluid with mixing and are unusable in this state. This waxy foam is difficult to purge from the container by pumping or other removal techniques and requires additional labor, tanker downtime, and expense to remove. Additionally, the waxy foam that is removed, which may be several percent by weight of the original product, must be scrapped or recycled and therefore adds additional cost to the process through discarded material, disposal expenses, and/or recovery costs.

In an embodiment of the present teachings, one or more stabilizer discs can be added to the fluid to reduce or prevent the formation of foam during storage or transport of the fluid. The one or more stabilizer discs are solid, chemically inert with respect to the fluid, and may be removed from the fluid either manually or through a straining or filtering process. The stabilizer disc floats on the surface of the liquid, and therefore has an overall density that is less than the density of the liquid. The stabilizer disc is reusable when properly cleaned between uses and functions over a wide variety of liquid materials to prevent formation of foam on the surface of the liquid when used in accordance with the teachings herein.

During testing, it was found that the effectiveness of the disc in preventing the formation of foam was related to the surface roughness of the disc. A surface that was either too smooth or too rough was not effective in preventing foam. Outside of a roughness range as described with reference to Table 1, the generation of foam increases.

Figure 2:
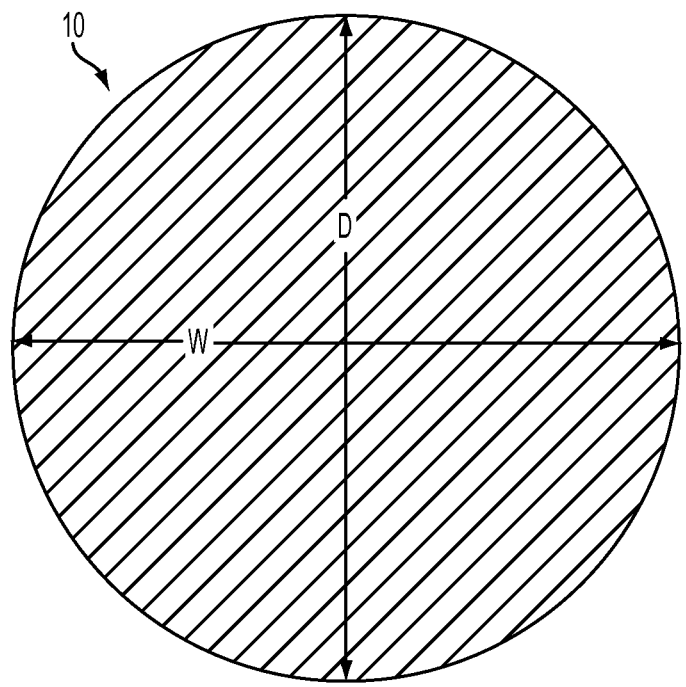
FIG. 2 is a plan view, of a stabilizer disc in accordance with the present teachings.

An embodiment of the present teachings includes one or more free floating stabilizer discs that float on the surface of the fluid during transportation and/or storage to reduce or eliminate the formation of foam. FIG. 1 is a cross section, and FIG. 2 is a plan view, depicting a representative stabilizer disc 10 in accordance with an embodiment of the present teachings. In FIGS. 1 and 2, the stabilizer disc 10 is circular in plan view and rectangular in cross section. The width "W" and the height "H" of each stabilizer disc may vary depending, for example, on the size of the container into which the stabilizer discs will be placed with the fluid. For example, the one or more stabilizer discs may each have a width "W" as depicted in FIG. 1 of from about 6 inches to about to about 24 inches. The one or more stabilizer discs may each have a height "H" as depicted in FIG. 1 of from, for example, 0.50 inch to 8.0 inches. The stabilizer disc is designed to have a height that is sufficient to keep the stabilizer disc rigid and to prevent bending during use, for example from the motion on the surface of the liquid. The height "H" (FIG. 1) will depend, for example, upon the given material from which it is manufactured and the diameter "W" of the stabilizer disc. The stabilizer disc must be sufficiently thick given the hardness of the material from which it is manufactured so that the disc does not bend or flex when used within the fluid.

The rectangular cross section, particularly the vertical sides that intersect the horizontal top and bottom at an angle of 90°, reduces the likelihood of a first stabilizer disc extending over the top or under the bottom of an adjacent stabilizer disc during use within a liquid. In an embodiment, a plurality of stabilizer discs used within a fluid are distributed evenly over the surface of the fluid and maintain spacing between adjacent stabilizer discs for most effective foam control.

A stabilizer disc 10 in accordance with the embodiment of FIG. 2 also includes a diameter "D" which is equal to the width "W" to provide a disc that is circular in plan view. Stabilizer discs that are circular in plan view are most effective in reducing or eliminating foam generation which used on the surface of a liquid. Without intending to be bound by theory, discs that are oval in plan view (i.e., discs that have a width "W" that is different from the diameter "D") are less effective in foam control than stabilizer discs that are circular in plan view, for example, because when high vibration occurs on the surface of the fluid, oval stabilizer discs tend to overlap each other within the liquid and each disc is less effective at equalizing its position on the liquid surface compared to a stabilizer disc that is circular in plan view. In contrast, stabilizer discs that are circular in plan view (FIG. 2) have a decreased tendency to overlap other stabilizer discs that are circular in plan view, particularly during periods of high vibration on the surface of the fluid within which the stabilizer discs are used.

Each stabilizer disc can be manufactured from various nonporous materials, for example polyethylene or other nonporous inert materials that will not chemically interact with the liquid for which it is designed. Further, the stabilizer disc must have a density less than a density of the fluid on which it is to be used so that the stabilizer disc is buoyant within the fluid.

Several surface roughness or surface finish parameters can be measured to define the surface of the stabilizer disc, wherein the surface of the stabilizer disc has a surface roughness for several parameters that is within a range of roughness values. Stabilizer discs having parameters within the ranges specified in Table 1 can be manufactured by one of ordinary skill in the art from the information disclosed herein. Stabilizer disc surface roughness can be formed by any available technique, for example, by acid etching, by mechanical etching using, for example, a stream of abrasive particles propelled under pressure against the outer surface of the stabilizer disc, by contact texturizing through the placement of a flowable material against a surface having a suitable roughness then curing and hardening the flowable material to result in a stabilizer disc, etc.

The surface roughness may be measured using a profilometer, for example, a two dimensional roughness meter such as a Tokyo Seimitsu Surfcom 1500 (Accretech America Inc. of Richardson, Tex.). Measurements may be performed using a 2 μm contact diamond probe type. As used herein, "$R_a$" is the average roughness centerline (mean roughness), "$R_q$" is the root mean square (RMS), "$R_p$" is the maximum peak height, "$R_v$" is the maximum valley depth, and "$R_t$" is the maximum peak to valley height. These measurement parameters are standard surface roughness parameters as known in the art.

The one or more stabilizer discs were found to reduce or prevent the generation of foam when used on the surface of a liquid when the surface roughness parameters were all within a certain range, and failed to prevent the generation of foam when one or more of the surface roughness parameters were at levels outside of the range. The stabilizer discs were effective in reducing or preventing the generation of foam when the surface roughness of the discs were within the ranges shown in Table 1. Materials with surface roughness outside the ranges provided in Table 1 were not as effective in preventing foam generation.

TABLE 1

| Surface Roughness Ranges for Effective Stabilizer Disc(s) | | | | |
|---|---|---|---|---|
| $R_a$ (μm) | $R_q$ (μm) | $R_p$ (μm) | $R_v$ (μm) | $R_t$ (μm) |
| 0.76-1.1 | 1.2-1.7 | 3.7-5.6 | 4.8-6.5 | 8.0-12.1 |

Figure 3:
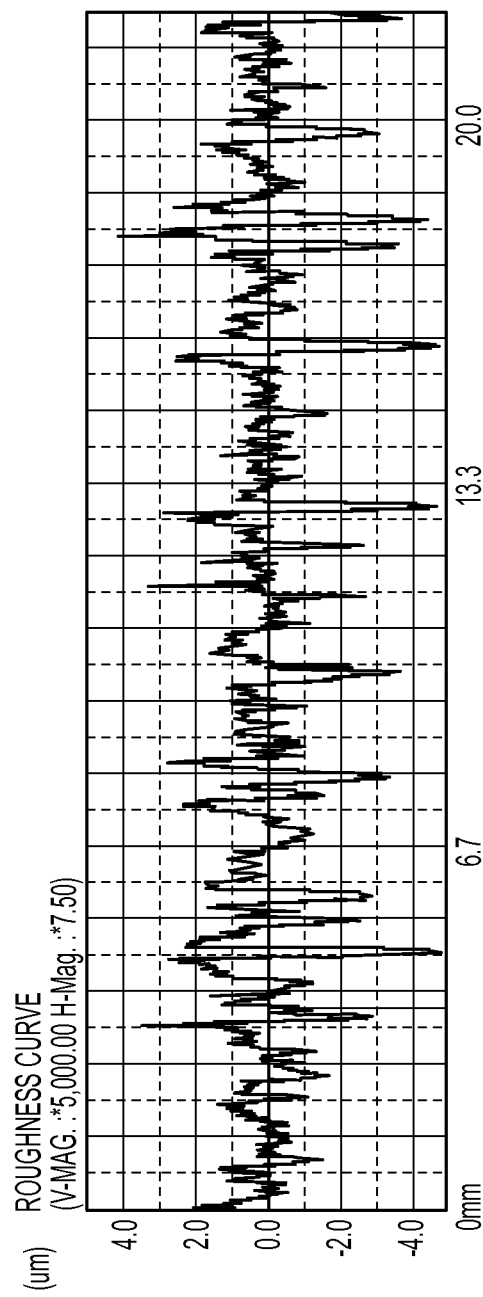
FIGS. 3 and 4 are graphs of a surface roughness of a stabilizer disc that is effective in reducing or preventing the formation of foam on a liquid during transport and/or storage.
Figure 4:
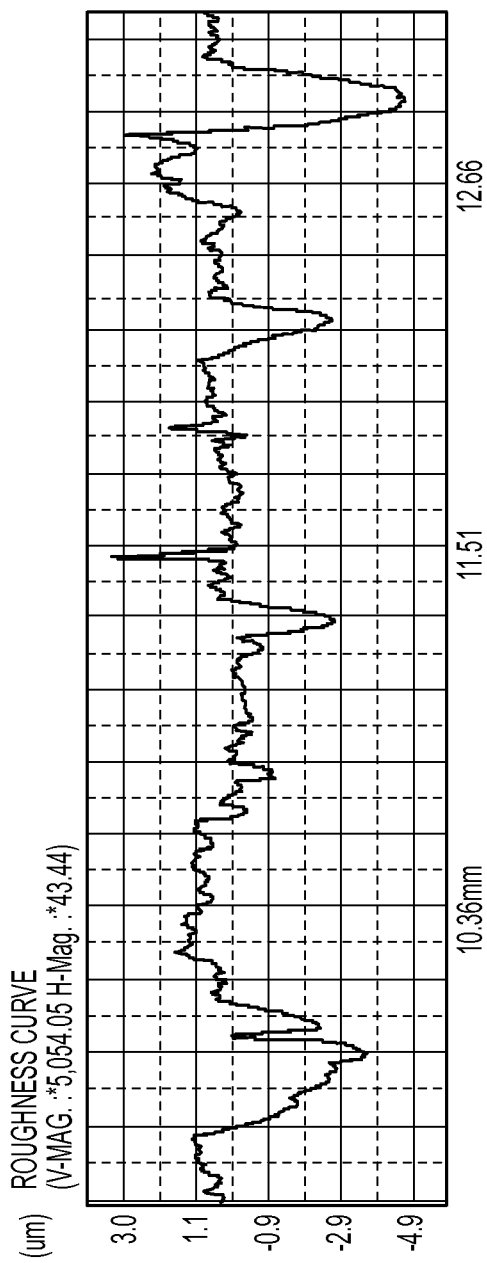

FIGS. 3 and 4 are graphs depicting roughness curves for a stabilizer disc that successfully reduced or eliminated foam generation during testing. Measurements for roughness depicted on the y-axis are averages in units of micrometers (μm), while the x-axis depicts distance across the surface of the stabilizer disc in units of millimeters (mm). FIG. 3 depicts a measurement over stabilizer disc surface length of about 22 mm, while FIG. 4 depicts a measurement over stabilizer disc surface length of about 4 mm. As may be determined from Table 1 and FIGS. 3 and 4, the surface of the sample stabilizer disc included many depressions. The effectiveness of the stabilizer disc in preventing foam generation was found to correlate with the number and amplitude of these depressions. A stabilizer disc having a surface roughness within the Table 1 range of values was more effective in reducing or preventing foam generation than stabilizer discs having a surface roughness either lower (i.e., a smoother stabilizer disc) or higher (i.e., a rougher stabilizer disc) than the effective sample.

Foam can be generated in a liquid medium such as an aqueous wax at specific vibrational amplitudes, such as a vibrational amplitude of about 2.0 millimeters per gram (mm/g). An amplitude of 2.0 mm/g was demonstrated to generate foam in a wax aqueous dispersion that replicated the foam seen in a tanker shipment of wax aqueous dispersion. One or more discs in accordance with an embodiment of the present teachings may be located on the surface of a fluid that has a tendency to form a foam when a low level vibration is present. The one or more discs are effective in reducing or preventing the formation of foam in a fluid subject to vibrational amplitudes that would otherwise result in the generation of a foam on the surface. A plurality of stabilizer discs as described is effective in preventing the formation of foam.

Discs were not effective in reducing or preventing the generation of foam when the surface roughness of the discs were within the ranges shown in Table 2.

TABLE 2

| Surface Roughness Ranges for Non-Effective Stabilizer Disc(s) | | | | |
|---|---|---|---|---|
| $R_a$ (μm) | $R_q$ (μm) | $R_p$ (μm) | $R_v$ (μm) | $R_t$ (μm) |
| 0.028-0.50 | 0.048-0.12 | 0.50-2.1 | 0.23-0.77 | 0.083-2.9 |

Figure 5:
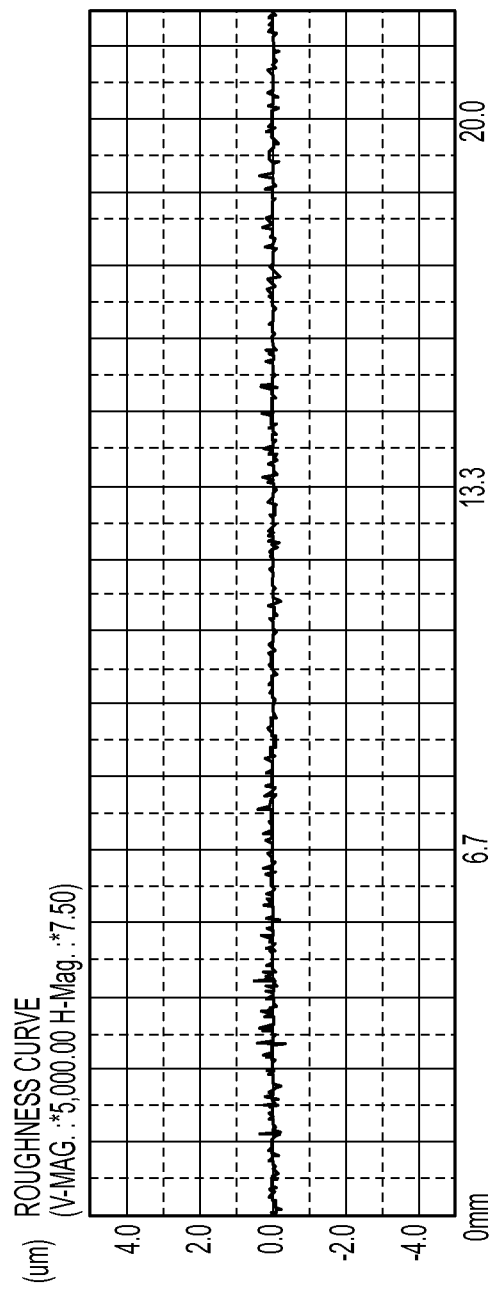
FIG. 5 is a graph of a surface roughness of a disc that is ineffective in reducing or preventing the formation of foam on a liquid during transport and/or storage.

FIG. 5 is a graph depicting a roughness curve for a disc that was not successful in eliminating or reducing foam generation to an acceptable level during testing. FIG. 5 depicts a measurement over about a 22 mm surface length of the disc. As may be determined from Table 2 and FIG. 5, the surface of the sample disc was relatively smooth.

Thus in an embodiment, a stabilizer disc (or each of a plurality of stabilizer discs) in accordance with the present teachings will have an exterior (exposed) surface, wherein the exterior surface has an $R_a$ of from 0.76 μm to 1.1 μm, an $R_q$ of from 1.2 μm to 1.7 μm, an $R_p$ of from 3.7 μm to 5.6 μm, an $R_v$ of from 4.8 μm to 6.5 μm, and an $R_t$ of from 8.0 μm to 12.1 μm. Stabilizer discs having these surface roughness measurements were found to be effective in preventing the formation of foam on the surface of a fluid under a vibrational amplitude that was found to otherwise generate foam on the fluid surface.

The surface of the fluid within the container has a surface area that depends on the size and shape of the container. During testing, it was found that the effectiveness of the one or more discs in preventing the formation of foam was further related to the percentage of the fluid surface covered by the one or more discs. During testing, it was found that the discs generally uniformly self-distributed relatively evenly across the surface of the fluid. It was further found that surface coverage that is either too small or too large was not effective in preventing foam. Additionally, surface coverage that is either too small or too large increased the generation of foam during a vibration event compared to the same vibration event without the discs that covered either too small of a percentage or too large of a percentage of the surface of the fluid.

In an embodiment, the stabilizer disc 10 as depicted in FIGS. 1 and 2 can cover 33% or more of a surface area of a liquid within a container, tanker, or vessel. In an embodiment, the stabilizer can cover 70% or less of the surface area of the liquid within the container, tanker, or vessel. In an embodiment, the stabilizer disc 10 can cover from 33% to 70% of the surface area of the liquid within the container, tanker, or vessel.

For example, a 44% surface area coverage of a liquid in a tanker configured at 62 inches in diameter and 486 inches long equates to the use of 7 discs each having a diameter of 24 inches. Another combination to cover 44% of a surface within a tanker configured at 62 inches in diameter and 486 inches long equates to the use of 12 discs each having a diameter of 18 inches. Yet another combination to cover 44% of a surface within a tanker of the same configuration includes the use of 28 discs each having a diameter of 12 inches.

Maintaining the surface area coverage with the disc within a range of ≥33% and ≤70% will allow the multiple discs to float freely on the surface of the liquid with no overlap of the discs. The maximum thickness of the disc is dependent on the width of the disc used. The disc should have a thickness that is sufficient for the material from which it is fabricated to provide rigidity when floating on the liquid so that the disc does not flex or bend. For example, a polyethylene disc having a diameter of 12 inches should have a thickness of at least 5 mm to provide sufficient rigidity.

As discussed above, one or more stabilizer discs were effective in preventing or reducing the formation of foam on a variety of liquids during testing. Without intending to be bound by theory, the stabilizer discs may break the surface tension or the sine waves resulting from low level vibration created within a solution during transportation and/or storage. In the absence of one or more stabilizer discs, the vibration may result in air ingestion by the liquid and a foam that floats on the surface of the liquid. During transport of a liquid in a tote, tanker, or other container, the one or more stabilization discs may break the surface tension at the interface of the air and the liquid, cancel out the low level vibration (sine wave) on the surface of the liquid during transportation, and reduce or prevent the formation of foam. The stabilizer discs may remain on the surface of the liquid to dissipate any air ingested by the liquid that may cause foam to form during pumping of the liquid into or out of the container. Further, the surface roughness within the disclosed range may provide a disc having a desirable friction coefficient with respect to the fluid, such that the movement of the disc within the fluid is sufficient to reduce or prevent foam generation within the fluid.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc. Note: Negative values refer to surface dimensions or roughness compared to a centerline.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims. Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for reducing the formation of a foam on a liquid within a container during transport and/or storage, comprising:
    placing at least one stabilizer disc into the liquid within the container, wherein the at least one stabilizer disc comprises:
        a width and a height, wherein the width is greater than the height;
        a surface roughness, wherein an average roughness centerline "$R_a$" of the surface roughness is from 0.76 µm to 1.1 µm; and
        a density that is less than a density of the liquid such that the stabilizer disc floats on an upper surface of the liquid during the transport and/or storage.

2. The method of claim 1, further comprising:
    placing a plurality of stabilizer discs into the liquid within the container, wherein the plurality of stabilizer discs are sufficient to cover from 33% to 70% of the upper surface area of the liquid during the transport and/or storage.

3. The method of 2, wherein the placing of the plurality of stabilizer discs further comprises placing a plurality of polyethylene stabilizer discs within the liquid.

4. The method of claim 3, wherein:
    each of the plurality of stabilizer discs has a circular shape in plan view, wherein the circular shape of each stabilizer disc decreases a tendency of each stabilizer disc to overlap other stabilizer discs of the plurality of stabilizer discs within the liquid; and
    the surface roughness of each circular stabilizer disc of the plurality of circular stabilizer discs comprises a root mean square "$R_q$" of from 1.2 µm to 1.7 µm, a maximum peak height "$R_p$" of from 3.7 µm to 5.6 µm, a maximum valley depth "$R_v$" of from 4.8 µm to 6.5 µm, and a maximum peak to valley height "$R_t$" of from 8.0 µm to 12.1 µm.

5. The method of claim 4, further comprising forming the plurality of stabilizer discs from polyethylene.

6. The method of claim 4, wherein the placing of the plurality of stabilizer discs within the liquid comprises placing the plurality of stabilizer discs into an aqueous wax dispersion comprising a surfactant.

7. The method of claim 4, wherein the width is from 6.0 inches to 24 inches and the height is from 0.5 inch to 8.0 inches.

* * * * *